United States Patent
Yamashita

(10) Patent No.: US 9,975,699 B2
(45) Date of Patent: May 22, 2018

(54) METHOD OF ORDER FULFILLING BY PREPARING STORAGE UNITS AT A PICKING STATION

(71) Applicant: Dematic GmbH, Heusenstamm (DE)

(72) Inventor: Shin Yamashita, Oberursel (DE)

(73) Assignee: Dematic GmbH, Heusenstamm (DE)

( * ) Notice: Subject to any disclaimer, the term of this patent is extended or adjusted under 35 U.S.C. 154(b) by 359 days.

(21) Appl. No.: 14/996,945

(22) Filed: Jan. 15, 2016

(65) Prior Publication Data

US 2016/0229633 A1    Aug. 11, 2016

Related U.S. Application Data

(63) Continuation of application No. PCT/EP2014/063929, filed on Jul. 1, 2014.

(30) Foreign Application Priority Data

Jul. 17, 2013    (EP) .................................... 13176795

(51) Int. Cl.
*B65G 1/00* (2006.01)
*B65G 1/137* (2006.01)
*B65G 37/00* (2006.01)
*B65G 1/04* (2006.01)

(52) U.S. Cl.
CPC ......... *B65G 1/1373* (2013.01); *B65G 1/1378* (2013.01); *B65G 37/00* (2013.01); *B65G 1/0407* (2013.01); *B65G 2209/10* (2013.01)

(58) Field of Classification Search
CPC ... B65G 1/1378; B65G 1/1373; B65G 1/1376
See application file for complete search history.

(56) References Cited

FOREIGN PATENT DOCUMENTS

| CN | 1817757 A | 8/2006 |
|----|-----------|--------|
| CN | 102101569 A | 6/2011 |
| CN | 102633077 A | 8/2012 |
| DE | 102009032406 | 1/2011 |
| DE | 102011106667 | 1/2013 |
| EP | 1767472 | 3/2007 |
| JP | 11292217 A | 10/1999 |
| JP | 2002179224 A | 6/2002 |
| WO | WO 2013/004712 A1 | 1/2013 |

OTHER PUBLICATIONS

International Search Report for PCT/EP2014/063929, dated Oct. 6, 2014.
Written Opinion for PCT/EP2014/063929, dated Oct. 6, 2014.

*Primary Examiner* — Saul Rodriguez
*Assistant Examiner* — Willie Berry, Jr.
(74) *Attorney, Agent, or Firm* — Womble Bond Dickinson (US) LLP

(57) ABSTRACT

A method of fulfilling orders by making orders available in order units by picking from product units in a storage facility is provided herein. The storage facility generally includes a manual storage and picking area and an automated storage and retrieval racking area, which automated storage and retrieval racking area can be arranged downstream or upstream from the manual picking area and connected to the manual picking area by a routing conveyor, which leads to a shipping area. In addition, the manual storage and picking area can include manual picking stations supplied and arranged along the extension of the routing conveyor so as to supply the routing conveyor with order units picked at the manual picking stations.

12 Claims, 13 Drawing Sheets

METHOD OF ORDER FULFILLING BY PREPARING STORAGE UNITS AT A PICKING STATION

CROSS REFERENCE TO RELATED APPLICATIONS

This present patent application is a continuation of International Application No. PCT/EP2014/063929, filed Jul. 1, 2014 by the inventor named in the present application, and claims the benefit under 35 U.S.C. § 119(a) of European Patent Application No. EP 13176795.6 entitled "Method of Order Fulfilling By Preparing Storage Units At A Picking Station," filed on Jul. 17, 2013, both of which patent applications are incorporated by reference herein in their entireties as though fully set forth herein.

TECHNICAL FIELD

The embodiments of this disclosure relate to a method of order fulfilling.

BACKGROUND

When operating storage facilities for order fulfillment several aspects should be taken into account as described below.

While picking or compiling orders from transporting units, such as e.g. articles or containers, it is necessary to provide the transporting or storage units, which are associated with a common order, in a directed or sorted fashion. In addition, it is conventional to intermediately store (buffer) the transporting units of an order, until all of the transporting units required for the order are present. They are then passed together onto a collecting line which leads them e.g. to the palletization area, picking station, goods issue, shipment etc.

In the picking station the goods for fulfilling an order are taken from the storage units and placed according to the order into an order container etc. The storage container (often called donor) is then routed back into the racking storage and stored until needed for the next order.

A (high bay) racking storage facility includes a storage-entry area, via which the goods are supplied to and from which the Automatic Storage and Retrieval Machine (hereafter called AS/RS) collects the goods for placement in storage, the so-called front-zone. In a similar manner, a retrieval area is required, at which after retrieval from storage the AS/RS deposit the goods which are likewise assigned to the front-zone. In the case of automatic picking storage facilities, picking locations are typically situated nearby the front-zone. In the front-zone, the goods are also identified for the inventory management system or the material flow computer.

EP 1 964 792 B1 for example discloses a method of making transporting units available from a storage facility on at least one collecting line. AS/RS in each storage racking aisle, retrieval-from-storage and outbound lines are controlled, in such a way as to be matched and coordinated to one another, and are loaded with goods that ultimately they end up on, or are discharged from, the collecting line in a sorted fashion.

The control and matching are thus relatively complex and require evident technical work in the so-called front-zone, i.e., the area outside the actual racking, is necessary to achieve high throughput and sequencing.

Further it is difficult to manage fluctuations in demand within storage facilities. Manually run storage facilities with manual picking stations usually capable of managing the fluctuation and have low initial costs and can be very effective for very low volume articles in general and high volume particularly across limited articles and low cost labor situations. However, they must be larger in space to handle the same amount of orders as automated systems. In addition, it is difficult to control the progress of manual operations in the timely fashion.

A high degree of automation works well for a demand at a sustained high level and high labor cost situations. However, if the automated system is maxed out no further increase in capacity is possible. Also some items cannot be automatically handled or picked.

In contrast thereto, embodiments of the present disclosure provide a method of order fulfilling, which provides the possibility of increasing and decreasing capacity so as to handle fluctuations in demand of order fulfillment, as well as addressing other related and unrelated problems in the art.

SUMMARY

In accordance with embodiments of this disclosure, a manual storage and picking area is combined with an automated storage and retrieval racking area, in other words a hybrid solution, is proposed, wherein applications with high fluctuation rates of demand/order fulfillment or existence of very slow movers or limited number of very fast movers can be best served. The manual picking area can be used not only to pick very slow movers and very fast movers in the economical and also efficient fashion, but also to cope with peak periods in demand and can, on the other hand, be switched off when not needed. This allows for keeping the automated storage and retrieval racking area in an optimal utilization range. Also, the manual picking area relieves the automated storage and retrieval racking area of some of the storage volume. It is also possible to use the automated storage and retrieval racking area to decouple the order fulfillment process.

Therefore, when the automated storage and retrieval racking area is located upstream of manual picking area it provides a regulating and sequencing function of order processing release which influences order release. This means that good control of when, what and how much and in what sequence picking of orders is conducted at the fully or semiautomatic picking station and orders are dispatched to the manual picking area for completion of orders.

When the automated storage and retrieval racking area is located downstream of manual picking area it provides a decoupling function of order processing between two areas as well as managing an order release. This means that it provides non-disturbing environment for both area which leads to increase in operating efficiency and good control of when, what and how much and in what sequence orders are released to the dispatched area.

According to one aspect of this disclosure, the storage facility comprises a manual picking area and an automated storage and retrieval racking area.

The automated storage and retrieval racking area is either arranged downstream or upstream from the manual picking area and is connected to the manual picking area by a routing conveyor, which leads to a shipping area. Therefore, the routing conveyor connects both picking areas and also serves as a dispatch conveyor of complete orders to a shipping area.

The manual picking area comprises manual picking stations arranged along the extension of the routing conveyor and supplying the routing conveyor with order units picked at the manual picking stations. The manual picking stations are also supplied by the routing conveyor with product and/or order units.

The manual picking area may also be supplied by a manual batch pick process combining several products from several different orders into a common container (dirty batch pick), from which the products are placed into product units and placed on the routing conveyor. The supply of the routing conveyor may also be performed with other known methods.

The manual picking stations may be of any kind and may also include temporary storages, e.g., Pallet flow rack or static location for very fast movers, flow rack for fast movers, shelves for slow movers, pick walls etc.

The automated storage and retrieval racking area comprises a storage racking comprising a plurality of multilevel storage racks in which order and/or product units are stored, wherein the storage racks are disposed back-to-back in pairs and have an aisle between pairs. In other words, the racks can have an aisle between them and each rack abuts a rack of a neighboring aisle.

Order and/or product units are fed into the storage racking by at least one storage-entry conveyor and retrieved by at least one storage-exit conveyor. Preferably, but not limited to, a storage-entry conveyor and a storage-exit conveyor are provided for each aisle.

Each storage racking aisle is serviced by at least one automatic storage and retrieval device (AS/RS) for storage and retrieval of order and/or product units from the storage. Preferably each level of each aisle can have a dedicated AS/RS machine, but also AS/RS devices serving two and more levels are possible.

Order and/or product units are exchanged directly between two adjoining storage racks from a source storage rack to an adjacent destination storage rack via cross conveyance locations in the storage racks themselves. This allows sorted retrieval from storage in a simpler manner and without sortation outside of the aisles, which can reduce technical complexity and space, lower cost and achieve better reliability. In accordance with embodiments of the invention, transporting or storage units are exchanged directly between two adjoining storage racking units from one rack of a storage racking aisle to an adjacent rack of a next storage racking aisle via cross conveyance locations in the storage racking units, and distribution and/or complex sorting in the front-zone can be omitted, since the transporting units are already stored in a single storage rack aisle even if initially they were stored elsewhere. When retrieved from storage, they are simply retrieved in sequence. Therefore, a direct transfer of the transporting units without distribution or sorting outside of the aisles can be achieved without "crossing" conveyors and this with a simpler and smaller technical installation with smaller space and higher reliability. The transporting or storage units can therefore just be retrieved from the respective aisle in the required sequence. This allows for reduction of the so-called front-zone installations. The storage is preferably can be a fully automated storage.

For example, storage racking locations of abutting racks are used for passing transporting or storage units from one side of the racking through to the next, so that the transporting units can be transferred from one racking to the next.

Therefore, cross conveyance or sorting is possible inside the racking units themselves and accordingly it is possible to dispense with "cross conveyance" in the front-zone.

If necessary the use of a front zone conveyor for cross conveyance can be combined with this concept especially if the front zone conveyor cannot be omitted for other reasons than cross conveyance, while reducing the complexity and throughput requirements of the front zone conveyor and control system.

In an expedient manner, the cross conveyance locations are provided in each level or any selected level of the storage racking units.

Particularly, effective path-time optimization is achieved if the cross conveyance locations are disposed closer to inbound and outbound conveyor line. It is also possible to locate cross conveyance locations at different positions within a level.

The cross conveyance locations can also be used as buffers, especially if they belong to final destination aisle of the transport or storage units, i.e., the transporting or storage units remain therein, until they are actually needed or retrieved.

The exchange can be effected actively or passively with regard to the AS/RS i.e., on the one hand the cross conveyance location can be simply a passive storage surface, on which the AS/RS of one aisle deposits transporting or storage units (quasi places them into storage) and from which the AS/RS of the adjacent aisle receives transporting units (quasi removes them from storage). For each racking storage location or cross conveyance location this procedure can always be performed in one direction only or in both directions.

Preferably the automatic storage and retrieval device itself can displace the order or product units in the cross conveyance locations, i.e. the AS/RS itself can be the active handling means, i.e., the units are handled only by the AR/RS also for exchange in the cross conveyance locations and these do not have an own drive means.

By reason of the simplicity of the cross conveyance locations, it is also possible to subsequently retrofit or refit cross conveyance locations and to adapt flexibly to the level of efficiency required in the storage system.

For exchange purposes, the AS/RS can likewise place the transporting units in double-depth storage or multiple-depth storage in the cross conveyance location. The AS/RS of one aisle can thus place the transporting or storage units in storage in the cross conveyance locations to such a depth that they are already to be assigned to the adjacent racking and can be reached "normally" by the AS/RS, in other words, the automatic storage and retrieval device of a source rack places the order or product units into the cross conveyance location in an adjacent destination rack. In addition, the load receiving means, e.g. telescopic arms, can have an extended range. It is also possible to use a stacked storage of transporting or storage units.

Since the cross conveyance locations are subjected to be utilized extensively and reduce a damage of transport or storage unit, it is expedient if the floors of the cross conveyance locations can be coated to reduce friction and/or structural reinforcement can be effected.

With the embodiments discussed herein, the AS/RS are "miniloads" or single-level racking serving units. For example, shuttles or satellite vehicles. A "miniload" AS/RS is a floor run multilevel storage and retrieval machine with a flexible load handling device that supports a wide range of individual articles, bundled or stacked articles, containers, trays, cartons of different sizes and weights. Also, shuttles with a stacked arrangement of two load handling platforms or an elevating platform are to be used in connection with the embodiments discussed herein for handling several levels from a single rail.

By way of example, so-called Multishuttles®, as manufactured by Dematic Systems GMBH, are used as the single-level AS/RS, which Multishuttles® are described, e.g., in EP 1 254 852 A1. The Multishuttle® is a system which can be used universally, is constructed in a modular fashion and combines storage and transportation in an integrated concept. The Multishuttle® supplements the domain of automatic small parts storage facilities as a high-performance, inexpensive and innovative solution. It is a rail-borne vehicle which operates in the racking and serves the entire storage system. The system concept is based upon autonomous rail-guided vehicles for container transportation which operate inside and outside the storage system. A specific load receiving means permits short load-change times and simultaneous loading and unloading. The system has travel rails which are installed in each level of the storage facility or elevated or suspended in the pre-zone. In addition to guiding the vehicles, they also supply voltage thereto.

The shuttle can be used in two arrangements, a so called "captive" or "roaming" arrangement. In the captive arrangement the shuttles can stay in their respective level. In the roaming alternative the shuttles can change levels as required.

It is thus possible to achieve a particularly high level of retrieval efficiency whilst fully maintaining the desired sequence of transporting or storage units in any aisle. This is also achieved with considerably less technical work than in accordance with known systems.

At least one lifting device is used, in order to transfer the order and/or product units to the at least one storage-exit conveyor, i.e., the lift allows for level changes of order and/or product units coming from the storage-entry conveyor or destined to the storage-exit conveyor. Usually this will be a stationary lift, but also AS/RS with lift functions (e.g. mini-load) could be envisioned.

The at least one lift is optionally of the drive-through-type, meaning that units may pass through the lift within the rack, as if it were a conveyor.

In one example embodiment, a lift is installed in each rack of an aisle and each lift is either an inbound-lift connected to the storage-entry conveyor or an outbound-lift connected to the storage-exit conveyor or inbound and outbound-lift connected to both storage-entry and storage-exit conveyor.

Possible lifts include in particular vertical conveying means. Each lift generally has one or more, for example two, locations/positions for the transporting or storage units, and each level of the storage racking can also have at least one buffer location for decoupling the single-level AS/RS and the lift. This renders it possible to fully utilize the quicker single-level AS/RS and to prevent empty-running of the lift.

Each lift may also have a separately driven conveying means for each location. By way of example, each lift has two locations which are each provided with a separately driven conveying means movable in different directions. Therefore, the transfer of two order/product units for each level can be effected simultaneously in different directions or onto different outbound buffers, e.g., to the left and right. In addition, the reception of the transporting units onto the lift may be controlled so that the two units are to be discharged onto one level. This is possible on account of the high efficiency of the shuttles used, since the transfer locations (buffer location) to the lift are practically always occupied, so that for the control of the lift there is provided a selection option which allows the lift to be occupied accordingly by transporting/storage units for different buffers of one level.

The automated storage and retrieval racking area also includes at least one fully or semiautomatic picking station for picking from product units into order units for fulfilling orders, to which order and/or product units are fed by the at least one storage-exit conveyor and from which order and/or product units are dispatched by the at least one storage-entry conveyor. It is also possible to use several fully or semiautomatic picking stations, for example one for each aisle.

In the present disclosure, a fully automated order picking station is defined as a picking station according to the goods-to-person principle with fully automated unit (totes, container, trays, boxes etc.) handling, i.e., a fully automated supply and discharge and presentation of the product and order units. Empty order units and units with commissioning goods are automatically supplied to the work station. Units are placed in ergonomically optimal height on the picking station. Usually such a station will also incorporate means for directing, instructing and controlling as well as supervising the picker (e.g. pick-to-light etc.), who will still manually pick out of product units into order units. As an option, operator may be replaced with automated picking device/machine to realize fully automated process.

In contrast a semiautomatic picking station may not have the fully automated unit handling just described, but rather can involve manual processing of units.

To fulfill orders, a routing conveyor is connected to the at least one inbound storage-entry conveyor and/or the at least one storage-exit conveyor of the storage racking, which may allow:

order units containing completed orders coming from the manual picking area to be dispatched via the routing conveyor to the shipping area or inducted into the storage racking of the automated storage and retrieval racking area via the at least one storage-entry conveyor for later dispatch;

order units containing completed orders coming from the storage racking of the automated storage and retrieval racking area to be dispatched via the routing conveyor to the shipping area;

order units containing completed orders coming from the fully or semiautomatic picking station of the automated storage and retrieval racking area to be dispatched via the routing conveyor to the shipping area or inducted into the storage racking of the automated storage and retrieval racking area via the at least one storage-entry conveyor for later dispatch;

order units containing partial orders coming from the manual picking area to be introduced into the storage racking of the automated storage and retrieval racking area via the at least one storage-entry conveyor for further processing; and order units containing partial orders coming from the fully or semiautomatic picking station or the storage racking of the automated storage and retrieval racking area to be introduced into the storage racking of the automated storage and retrieval racking area or to the manual picking area for further processing;

This may make either immediate or controlled order release possible depending on the necessities.

The automatic storage and retrieval device (AS/RS) may be fed by an inbound-buffer and may feed into an outbound-buffer, wherein the buffers are arranged within storage racks, and the cross conveyance locations are arranged, for example, but not limited to, directly behind/next to the inbound-buffer and/or outbound-buffer of a corresponding storage rack.

Further, it is possible to form a conveyor loop with the at least one storage-entry conveyor, the at least one lift and the at least one storage-exit conveyor, wherein the at least one lift is fed by the storage-entry conveyor and itself feeds the storage-exit conveyor.

Then the outbound-buffer may feed into the conveyor loop and inbound-buffer can be fed by the conveyor loop. The picking station should be incorporated into the loop.

The routing conveyor may further have either one or two levels per each picking level and there may be more than one picking level. In one embodiment, the lower level routing conveyor supplies partial order and/or product units from the storage racking of the automated storage and retrieval racking area to the fully or semiautomatic picking station and the upper level routing conveyor returns partial or completed order and/or product units to the storage racking of the automated storage and retrieval racking area. Then it is possible that the lower level routing conveyor supplies empty units to the fully or semiautomatic picking station. The other way around is also possible, meaning that upper level routing conveyor supplies partial order and/or product units as well as handing empty units and lower level routing conveyor returns partial order/product units.

A single level conveyor can be used. For example, when there is no need for handling order totes within the system, then product units can be retrieved one after another in the sorted fashion and no empty order unit must be handled.

It should be understood that where the term "order units" or likewise "product units" is used, it is not to be interpreted as limiting; in fact other types of transport can also be used equally effectively within the scope of this disclosure. In particular, the term "product units" or "order units" also includes totes, trays, containers, paperboard containers, carton boxes, stacks of articles, packages or units, packaging units—i.e., combined individual articles, etc., and individual articles.

The order or product units can be placed in storage randomly ("chaotically") being distributed over the entire system without knowledge of the subsequent sequence when they are retrieved. In contrast to DE 299 12 230 U1, no restriction as to possible modules or storage areas may be required.

Embodiments of this disclosure can further be characterized by a high degree of flexibility, since the inbound and outbound feeding lines can be connected to the corresponding lifts at any points.

In parallel with the outbound lifts, it is likewise possible to provide dedicated inbound lifts with correspondingly supplying distribution feeding lines. On the other hand, it is also possible to control the outbound lifts such that in addition to the outbound operation they can also be used as inbound lifts. In the reverse scenario, optionally present dedicated inbound lifts can also be used as outbound lifts according to requirement. In the event of malfunctions of individual lifts, this also permits uninterrupted operation or an increase in system efficiency. To this end, the inbound or outbound lines can be disposed between the lift and racking at different heights. Thus, the presence of two similar combined inbound and outbound levels typically will be provided, the collecting lines of which can be brought together after passing the last outbound line in sequence.

The transverse displacement function, i.e., the exchange of unite within the cross conveyance locations in the rack by the AS/RS itself, offers the advantage that, in the event of a malfunction of e.g. an outbound lift/inbound lift or feeding lines, the function of the relevant aisle can be maintained.

These and other advantages and aspects of the embodiments of the disclosure will become apparent and more readily appreciated from the following detailed description of the embodiments and the claims, taken in conjunction with the accompanying drawings. Moreover, it is to be understood that both the foregoing summary of the disclosure and the following detailed description are exemplary and intended to provide further explanation without limiting the scope of the disclosure as claimed.

Further features and details of the invention are apparent from the description set forth hereinafter taken with the accompanying drawings.

BRIEF DESCRIPTION OF THE DRAWINGS

The accompanying drawings, which are included to provide a further understanding of the embodiments of the present disclosure, are incorporated in and constitute a part of this specification, illustrate embodiments of the invention, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

Figure 1:
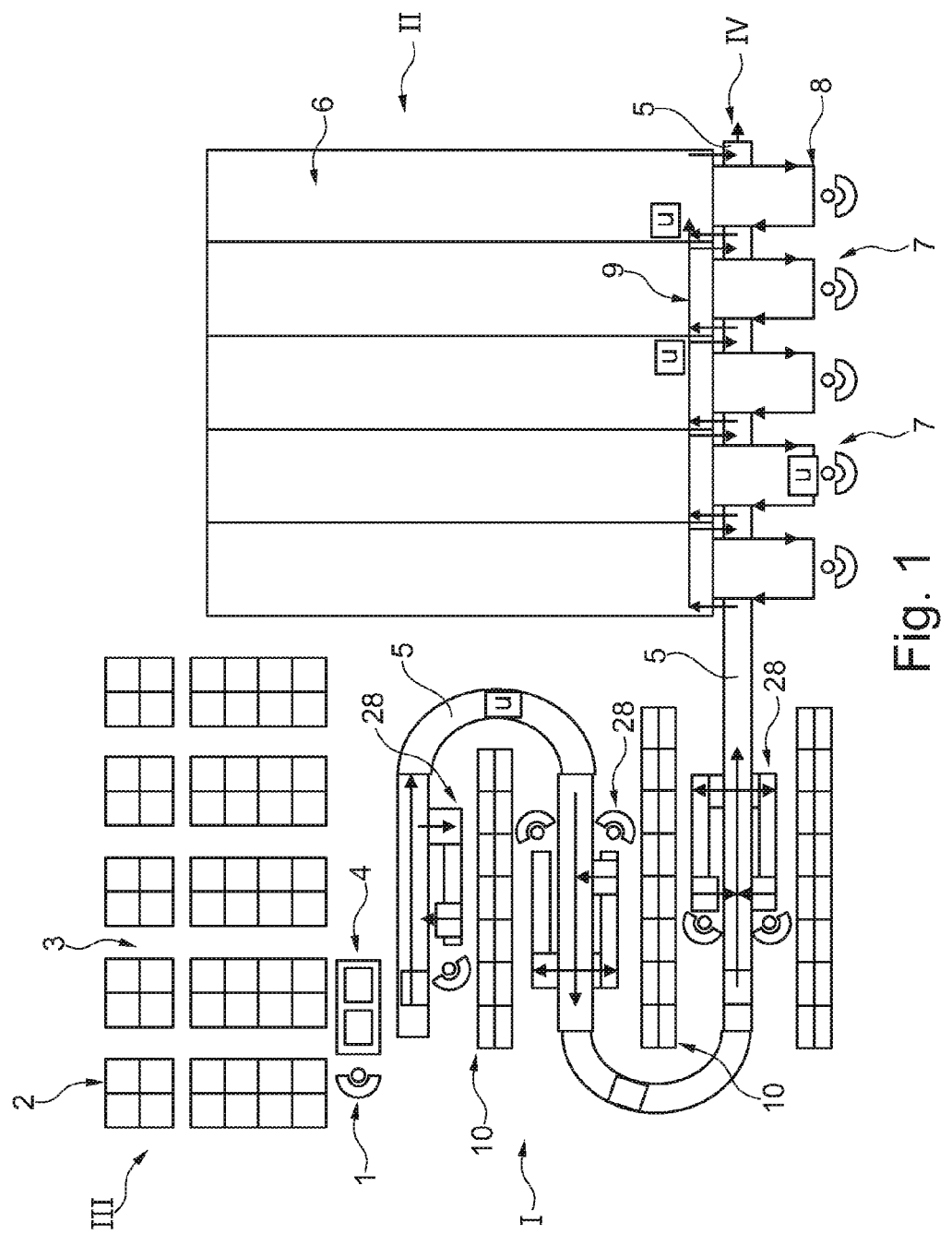
FIG. 1 shows a schematic plan view of a storage facility with a manual storage and picking area and an automated storage and picking area according to one embodiment.

In FIG. 1, a schematic plan view of a storage facility with a manual storage and picking area I and with an automated storage and retrieval racking area II is shown.

The automated storage and retrieval racking area II is arranged downstream from the manual picking area I and is connected to the manual picking area I by a routing conveyor 5, which eventually leads to a shipping area IV.

Other way round is also possible, the automated storage and retrieval racking area II would then be arranged upstream from the manual picking area I and connected to the manual picking area I by a routing conveyor 5, and the end of the routing conveyor would lead to a shipping area IV.

The manual storage and picking area I is typically supplied by a manual batch pick process, but not limited to, combining several products from several different orders into a common container (dirty batch pick), from which the products are placed into product units and placed on the routing conveyor 5. Also, the use of discrete picking for supply of the manual picking area I is possible.

The manual batch pick process takes place in a batch pick area III with manually serviced racks or shelves 2 separated by aisles 3 into which a picker 1 takes his picking cart 4 and gathers the articles/products according to orders assigned to him.

The manual storage and picking area I further comprises manual picking stations 28 supplied and arranged along the extension and on one or both sides of the meandering routing conveyor 5 and supplying the routing conveyor 5 with order units U picked at the manual picking stations 28.

The picking stations 28 are connected to the routing conveyor by conventional conveying technology, like roller or belt conveyors, and may also include temporary storage shelves 10 from which certain products may be picked and placed into order units.

The picking stations 28 are either operated separately or by two pickers at the same time.

Alternatively, "pace belt pick" can be used instead of zone picking station 28 with zone routing conveyors. "Pace belt pick" will generally have a straight routing conveyor with no zone diverting system and the order units will run on this at consistent pace. The picker picks required articles and puts them into the order units on the fly within each picking zone. Otherwise, the conveyor may stop until product is inducted.

Many of the below embodiments have similar or like devices, installations etc., which are therefore indicated by same reference numerals.

Figure 2:
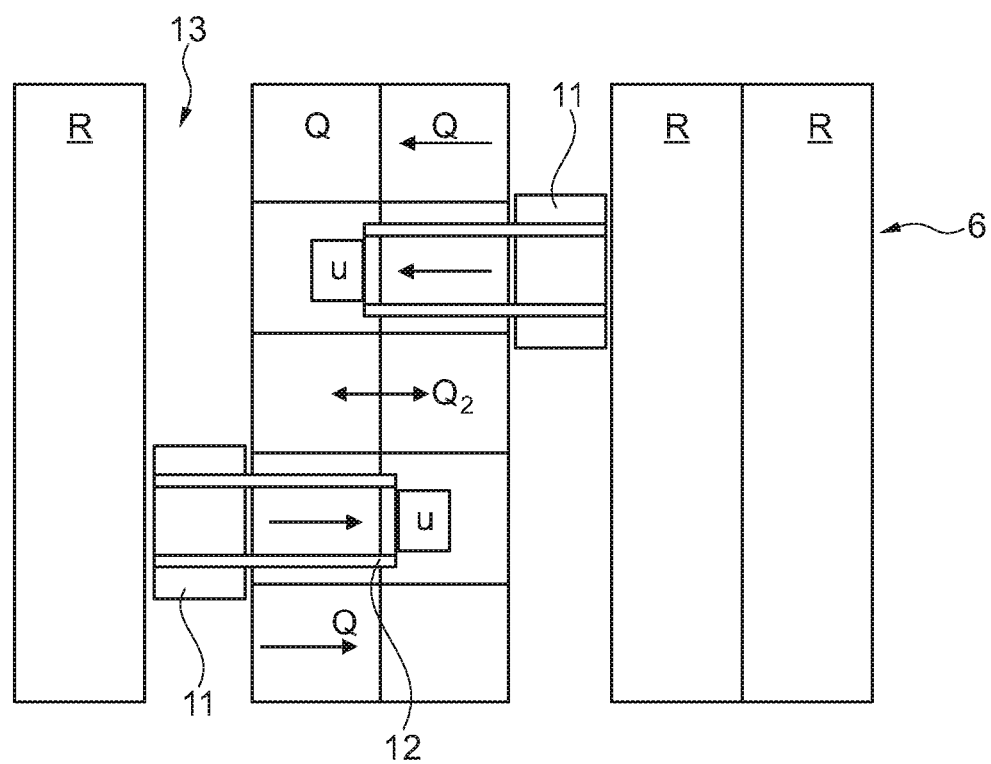
FIG. 2 shows a typical schematic plan view of exchange of transport units between racks within the racking storage in the automated storage facility of FIG. 1.

The automated storage and retrieval racking area II comprises a storage racking 6 comprising a plurality of multi-level storage racks R in which order and/or product units U are stored, wherein the storage racks R are disposed back-to-back in pairs and have an aisle 13 between pairs (FIG. 2).

The aisles 13 are connected to semi or full-automated picking stations 7 through conveyor installations 8, which encompass at least one storage-entry conveyor 14 provided for feeding order and/or product units U into the storage racking 6, R, and at least one storage-exit conveyor 15 provided for retrieval of order and/or product units U from the storage racking 6, R.

So the semi/full automatic picking station 7 for picking from product units D (D for donor) into order units O (O for order) for fulfilling orders are fed by the at least one storage-exit conveyor 15 and order and/or product units are returned to the storage rack by the at least one storage-entry conveyor 14.

The routing conveyor 5 is also connected to the at least one inbound storage-entry conveyor 14 and the at least one storage-exit conveyor 15.

Each storage racking aisle 13 has one automatic storage and retrieval device in the form of a shuttle 11 provided in each level or each few levels for storage and retrieval of order and/or product units in the storage racks R.

Order and/or product units U are exchanged directly between two adjoining storage racks R from a source storage rack to an adjacent destination storage rack via cross conveyance locations Q in the storage racks themselves (see FIG. 2), which can be one way exchange locations Q or bidirectional.

The shuttle 11 may displace the order or product units U in the cross conveyance locations Q actively with its load handling means 12, which are telescopic arms on both sides of a loading platform and are equipped with unit handling levers. There is no active drive means within the racks R themselves.

The shuttle 11 of a source rack places the order or product units U into the cross conveyance location Q in an adjacent destination rack, so that the shuttle operating in the according, neighboring aisle can handle the unit by normal deep operation. In other words, the sourcing shuttle operates deeper than for normal single or double deep storage, e.g., triple deep for exchange.

Therefore it is possible to transfer units U through the storage racking 6 in the sense of arrow 9 without leaving the storage.

The semi/full-automated picking stations 7 may have many different configurations.

Figure 3:
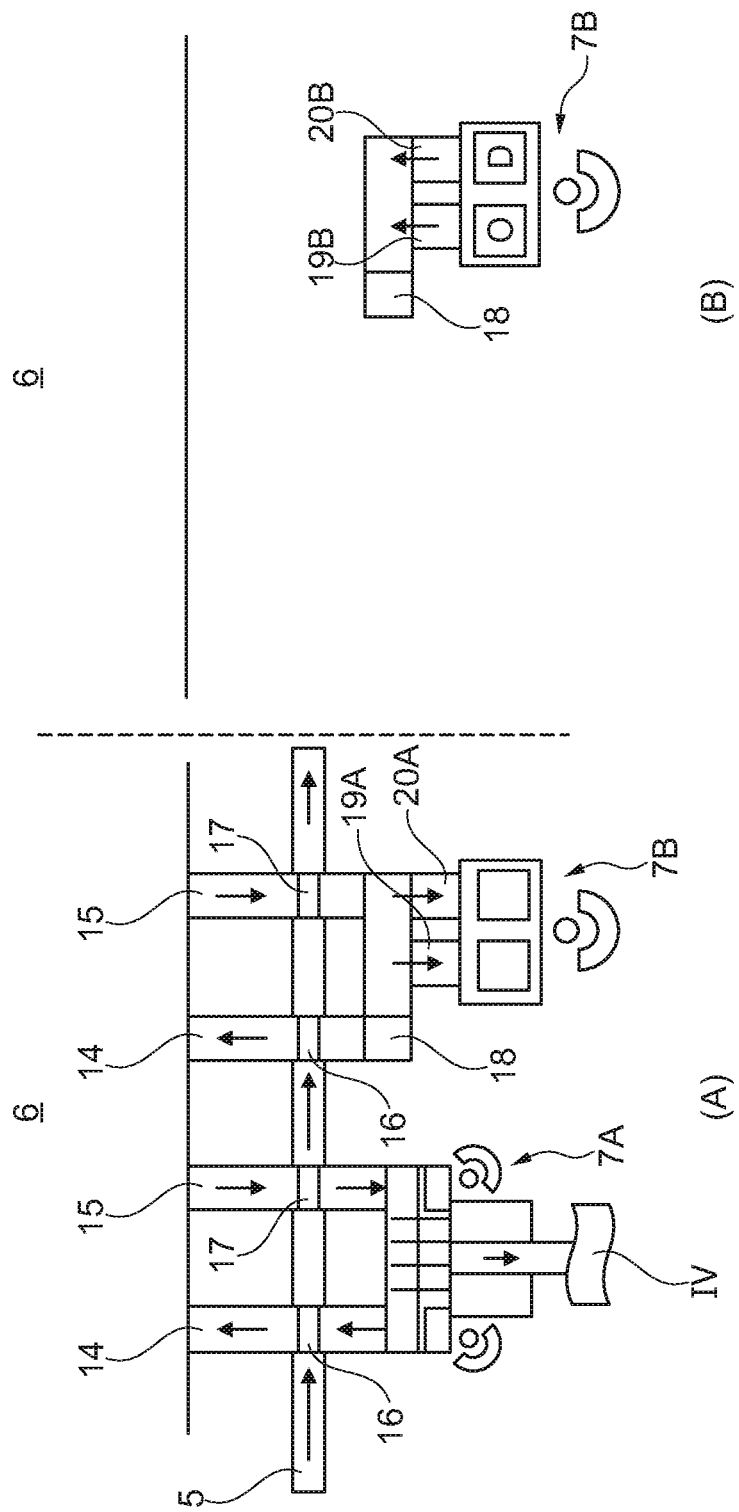
FIG. 3 shows a typical schematic plan view of a first and second picking level in a storage facility with a single level routing conveyor.

As illustrated in FIG. 3, the semi-automated picking station 7A (left hand side) is directly connected to an aisle 13 of the storage racking 6 via one storage-entry conveyor 14 and one storage-exit conveyor 15, which in turn are connected/pass through the routing conveyor 5 by right-angle-transfer-devices 16, 17, also called RAT in the art.

The semi-automated picking station 7A incorporates one/two work places for pickers and in between a dispatch conveyor for direct dispatch of complete orders to the shipping area IV. Such a station is ideal for small orders as in e-commerce.

Alternatively, or in addition, full-automated picking stations 7B may be used, which is arranged in such a way as to receive order units O and product units D in level A via one storage-entry conveyor 14 and one storage-exit conveyor 15, which in turn are connected/pass through the routing conveyor 5 by right-angle-transfer-devices 16, 17, as before, but end in servicing conveyors 19A for order units O and 20A for product or donor units D.

However, the dispatch of the order units O and product or donor units D is performed by servicing conveyors 19B for order units O and 20B for product or donor units D on a higher level B (right hand side). This is achieved by a level changing conveyor device 18 which routes onto the storage-entry conveyor 14 on level A.

The routing conveyor 5 has only one level in level A and can be used to supply complete orders to the shipping station IV.

Figure 4:
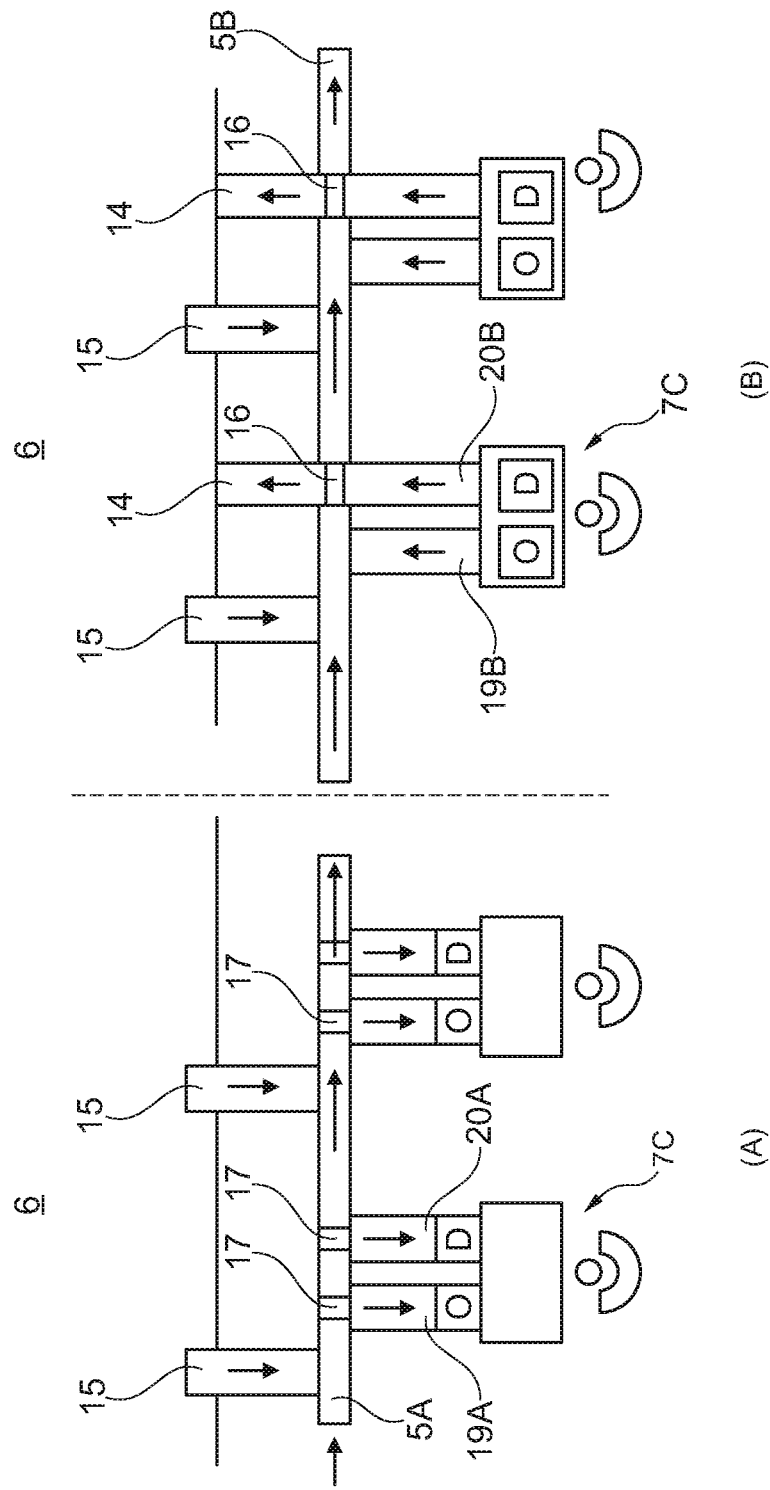
FIG. 4 shows a typical schematic plan view of a picking level in a further storage facility with a two level routing conveyor.

Alternatively, as depicted in FIG. 4, the routing conveyor 5 may have two levels 5A and 5B, i.e., one conveying level in each level A (left hand side) and B (right hand side).

In level A, the picking station 7C is supplied with order units O and product units D similar as above, but the servicing conveyors 19A and 20A are generally not directly aligned with the storage-exit conveyors 15 but are located downstream on the routing conveyor 5A and reachable by using RAT 17.

Level B is therefore used for dispatch of order units O and product units D from station 7C, by servicing conveyors 19B for order units O and 20B for product or donor units D on a higher level B (right hand side). Servicing conveyor 19B is not aligned with storage-entry conveyor 14 (in analogy to level A) but via RAT 16 downstream. In contrast servicing conveyor 20B is aligned with storage-entry conveyor 14. Therefore order units O from station 7C may pass through RAT 16 and be conveyed downstream on routing conveyor 5, whereas product units D can be directly routed back into storage. Also order units O may be redirected by RAT 16 into storage.

The storage and picking described above therefore allows:
order units containing completed orders coming from the manual storage and picking area I to be dispatched via the routing conveyor 5 to the shipping area IV or introduced into the storage racking 6 of the automated storage and retrieval racking area II via the at least one storage-entry conveyor for later dispatch;
order units containing completed orders coming from the storage racking 6 of the automated storage and retrieval racking area (II) to be dispatched via the routing conveyor 5 to the shipping area IV;
order units containing completed orders coming from the semiautomatic picking station 7 of the automated storage and retrieval racking area (II) to be dispatched via the routing conveyor 5 to the shipping area or introduced into the storage racking 6 of the automated storage and retrieval racking area (II) via the at least one storage-entry conveyor 14 for later dispatch;
order units containing partial orders coming from the manual storage and picking area (I) to be introduced into the storage racking 6 of the automated storage and retrieval racking area (II) via the at least one storage-entry conveyor 14 for further processing or introduced directly into the semi/full automatic picking station 7 for immediate processing;
order units containing partial orders coming from the semi/full automatic picking station 7 of the automated storage and retrieval racking area (II) to be introduced into the storage racking of the automated storage and retrieved to semi/full automatic picking station 7 for further processing;

At least one lift 21 used for changing levels of the units, in order to transfer the order and/or product units to the at least one storage-exit conveyor 15 and to receive order and/or product units from the storage-entry conveyor 14. Lift 21 may have more than one location for units, in order to carry more than one unit at the same time.

Figure 5:
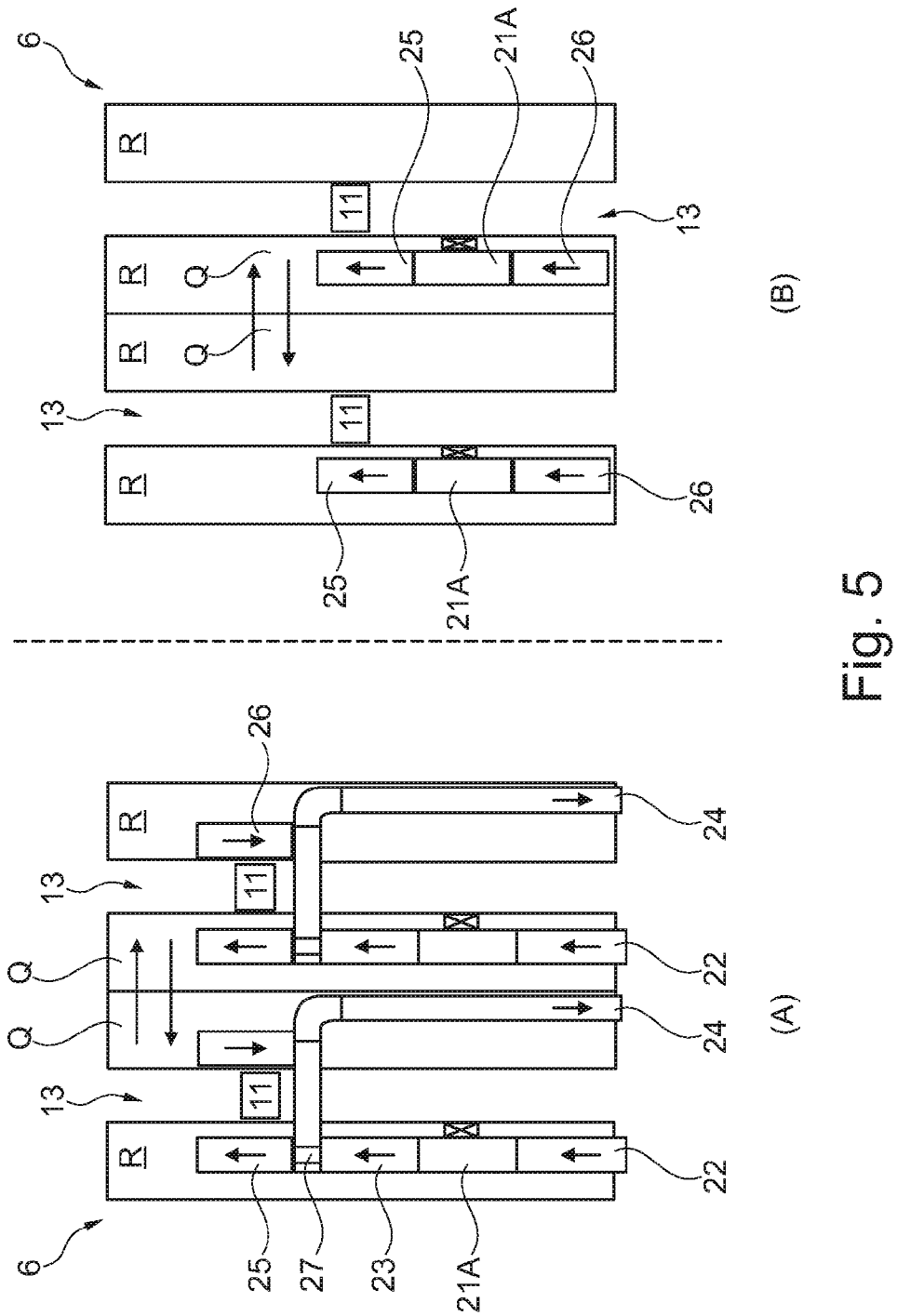
FIG. 5 shows a typical schematic plan view of a drive through type layout consisting of a picking level and other storage levels of a further storage facility.
Figure 6:
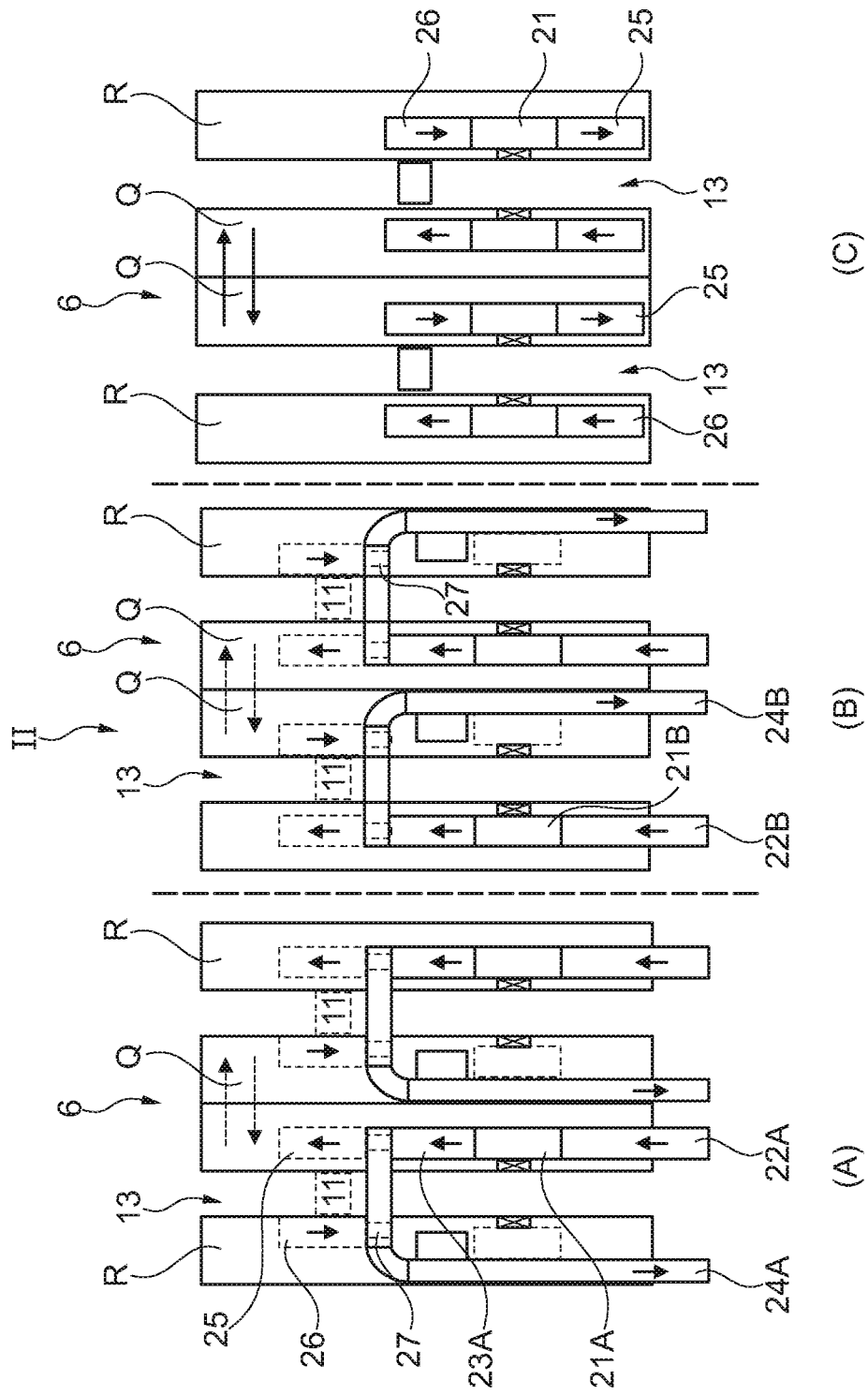
FIG. 6 shows a typical schematic plan view of a drive through type layout consisting of first and second picking levels and other storage levels in a further storage facility.
Figure 7:
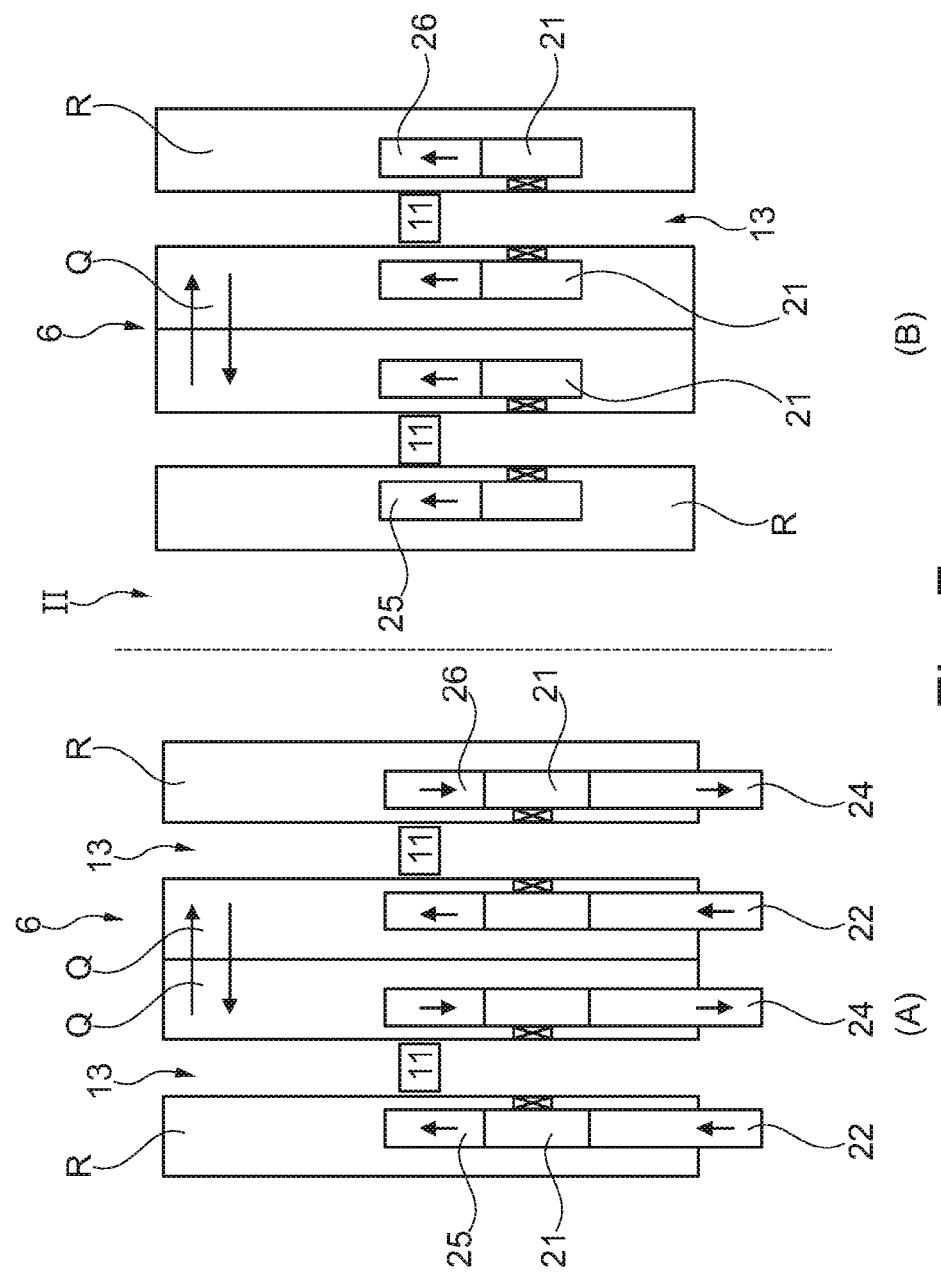
FIG. 7 shows a typical schematic plan view of a single sided type layout consisting of a pair of single cycling lifts, a picking and other levels in the storage racking of a further storage facility.

How many lifts 21 are used and how these are arranged may depend on the specific implementation. With reference to FIGS. 5-7 some possible installations are described below.

Referring to FIG. 5, level A of the racking may be connected to the storage-entry conveyor 14 with inbound-conveyor 22, which in turn leads into lift 21A, which is of the drive-through kind. Lift 21 in turn may allow for a level change of units. In other storage levels B, for example, lift 21 is supplied by buffer conveyor 26 and dispatches into buffer conveyor 25, so that the shuttle 11 in this level may pick up or drop off units respectively.

To dispatch units from the racking to the picking station 7 etc., units are typically conveyed from lift 21A in level A onto outbound conveyor 23, from which the units either are redirected via a RAT or puller 27 onto exit-loop conveyor 24 and then on to storage-exit conveyor 15. Alternatively, the units may pass through RAT 27 onto buffer conveyor 25 in level A. Units to be dispatched from racking in level A can be dropped off onto buffer conveyor 26 by shuttle 11 in level A, which is connected to exit-loop conveyor 24.

Extra conveyor loop(s) can be added if there is more than one picking station level.

The arrangement according to FIG. 6 is very similar to the one of FIG. 5; however the installation in level A is mirrored in level B, so that level A is serviced by lift 21A and exit-loop conveyor 24A, which passes by lift 21B, which in turn services level B together with exit-loop conveyor 24B and passes by lift 21A. Under this scenario, units stored on level A generally will not be retrieved to level B and vise versa whilst units stored in other storage levels can be retrieved to both level A and level B and vise versa.

Each level A and B may then either feed onto a single or double level routing conveyor 5 or picking stations etc. as described above.

Extra conveyor loop(s) either one going clock wise or counter clock wise or both can be added to each lift if there are more than two pick station levels.

In other storage levels C, as generally shown in FIG. 6, lift 21 is supplied by buffer conveyor 26 and dispatches into buffer conveyor 25 in each rack R, so that the shuttle 11 in this level may pick up or drop off units respectively.

As indicated by the hashed lines in levels A and B, the buffer conveyors 25, 26, shuttles 11 and RAT's 27 as well as cross-conveyance locations Q are optional on these picking levels (FIG. 6).

As shown in FIG. 7, each aisle 13 typically has a pair of lifts 21, one in each rack R, one for inbound 21A and another one for outbound 21B transportation with inbound conveyor 22 feeding it and outbound conveyors 24 receiving from it respectively supplied from/to routing conveyor(s) 5 or picking stations 7. The other levels B are generally similar to level C of FIG. 6, however they may only have one buffer conveyor 26 and one buffer conveyor 25, each in a rack R as shown.

With such an arrangement, units stored in any level can be routed to any picking level and vise versa.

Extra a pair(s) of inbound and outbound conveyors can also be added if there are more than one picking station levels.

Figure 8:
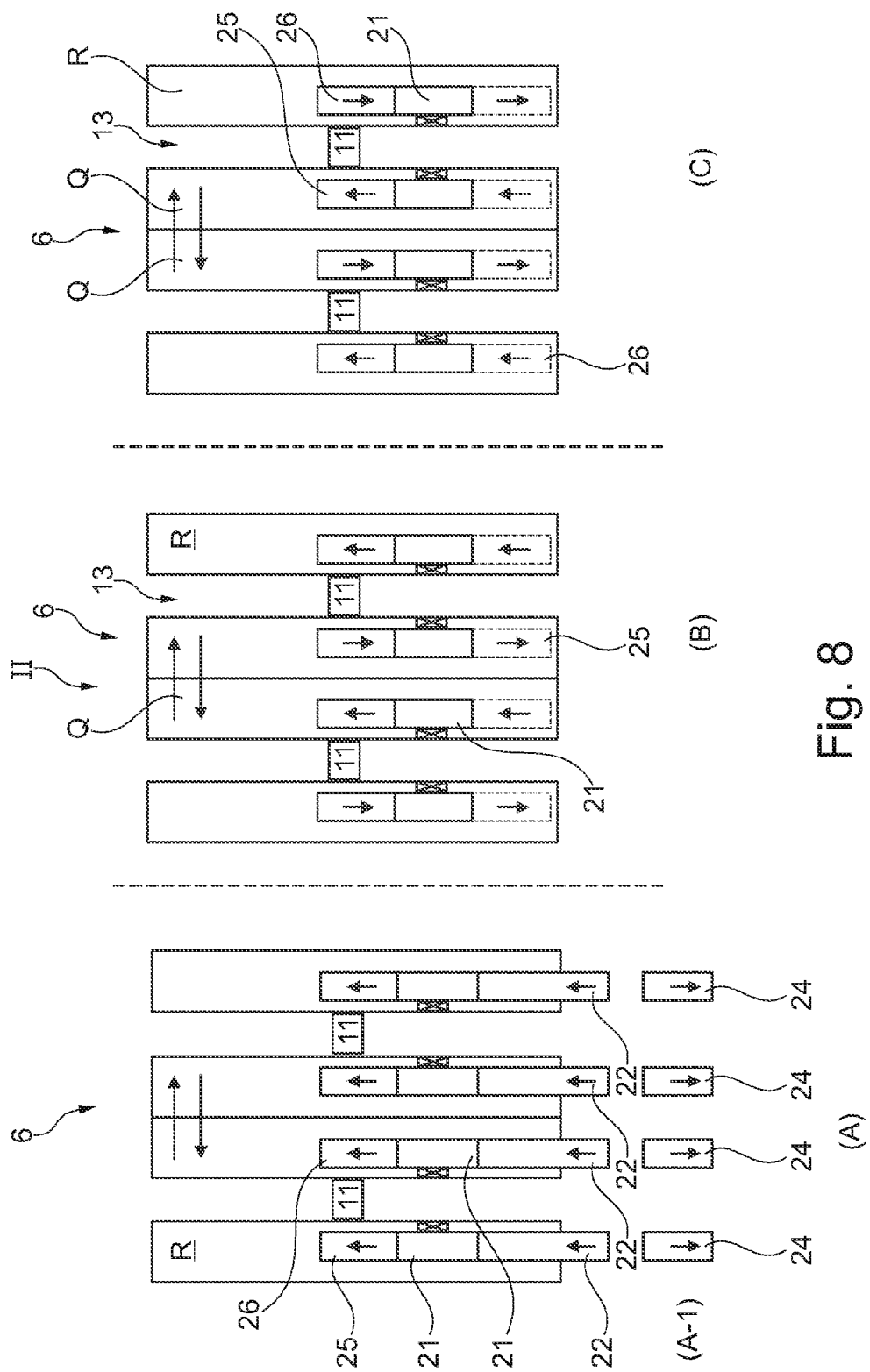
FIG. 8 shows a typical schematic plan view of a single sided type layout consisting of a pair of dual cycling lifts, picking level(s) with options and other levels in a further storage facility.

In the embodiment shown in FIG. 8 each rack R of an aisle 13 has a lift 21, as in FIG. 7. However, this embodiment can have two inbound and two outbound conveyors 22, 24 per aisle feeding the lifts and receiving from them respectively from/to routing conveyor(s) or picking stations. The two inbound conveyors 22 are directly on level A and the two outbound conveyors 24 are in a level A-1, which is not a full level below, but beneath level A such that they may all two feed one picking level and two below takes return from the same picking level.

In other storage levels B, C, an additional pair of buffer conveyors can be added to increase the lift throughput as well as better routing. With optional buffer conveyors, unit stored in any levels can be routed to any picking level and vise versa. Form level B to C (and so on) the buffer conveyors are alternated in their conveying direction in every or every few levels, i.e., in even levels a rack R has buffer conveyors in a certain direction and in odd level in opposite direction if additional pair of buffer conveyors on each level are not allocated. Such an arrangement realizes the dual cycle lift operation which improves lift performance.

Extra pair(s) of inbound and outbound conveyors can be added if there are more than one picking station levels.

Figure 9:
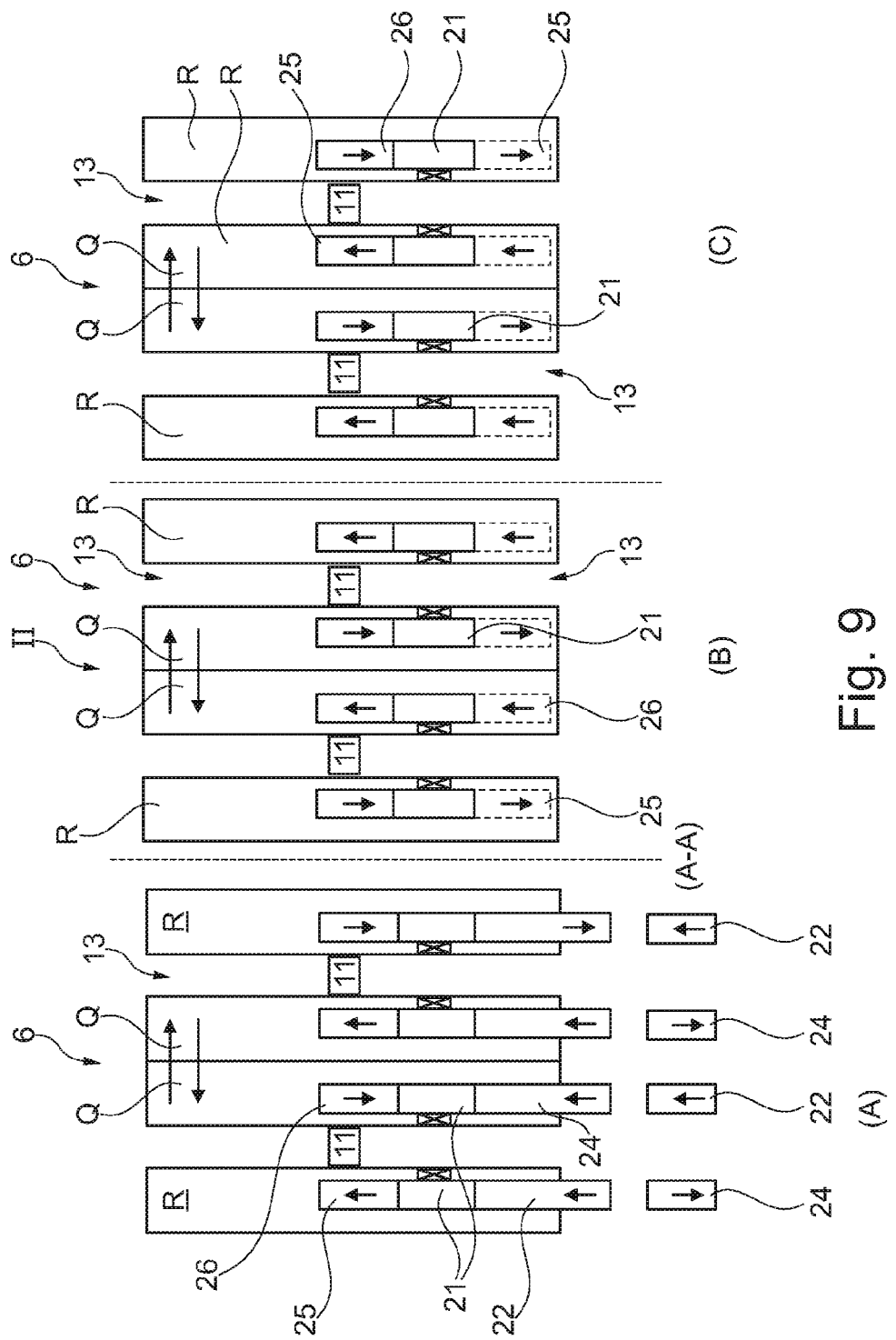
FIG. 9 shows a typical schematic plan view of an example embodiment layout with a pair of inbound and outbound conveyor/aisles that alternates by racks.

The embodiment of FIG. 9 differs from FIG. 8 in that a pair of inbound and outbound conveyors/aisle alternate by racks R of aisles 13, as in FIG. 7, so that each level A has two inbound conveyors and two outbound conveyors. Below this level A is a second level A-A which is now a full level below level A such that two picking levels are supplied with units.

Figure 10:
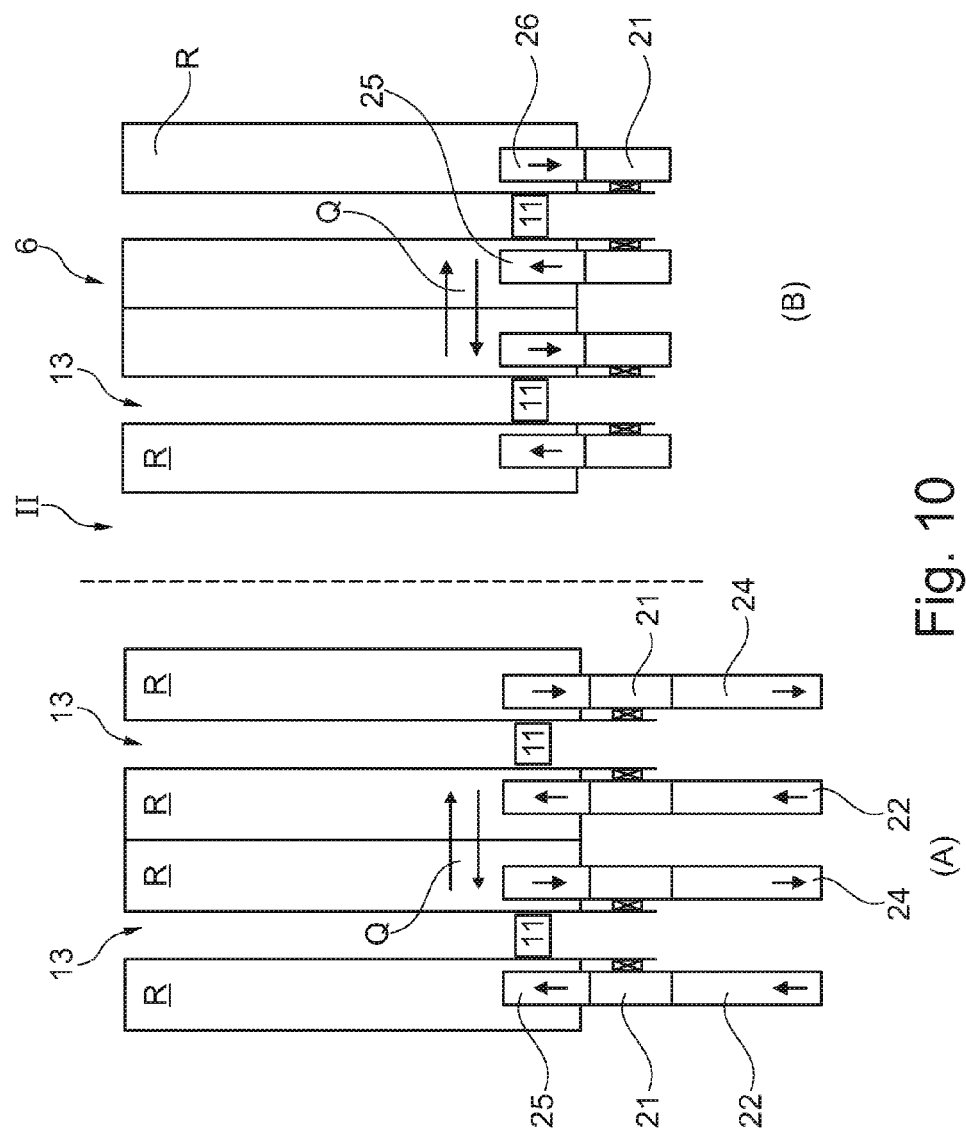
FIGS. 10-12 show alternative Versions of the respective embodiments of FIGS. 7, 8 and 9 with lifts outside of the storage racking.
Figure 11:
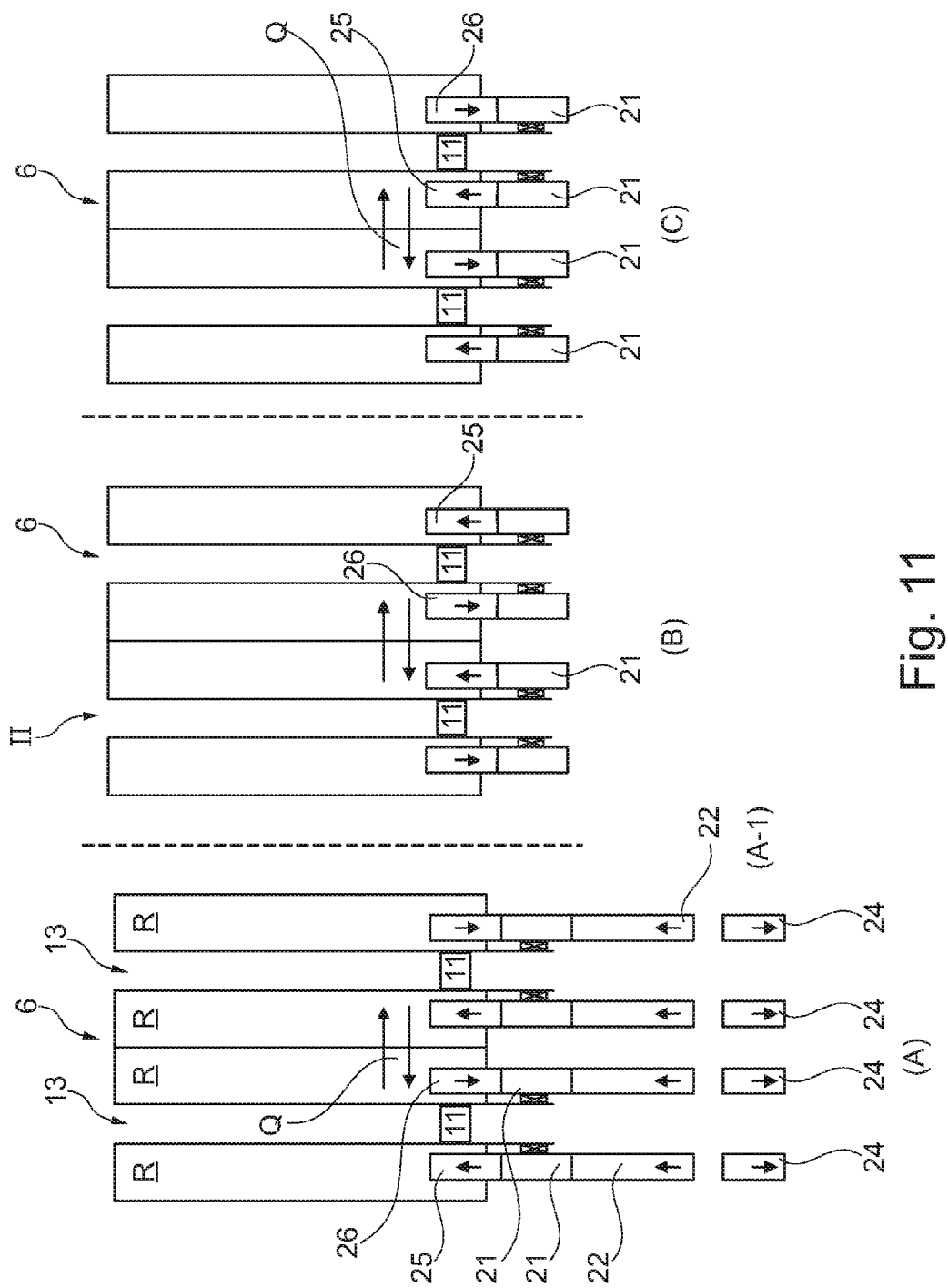
Figure 12:
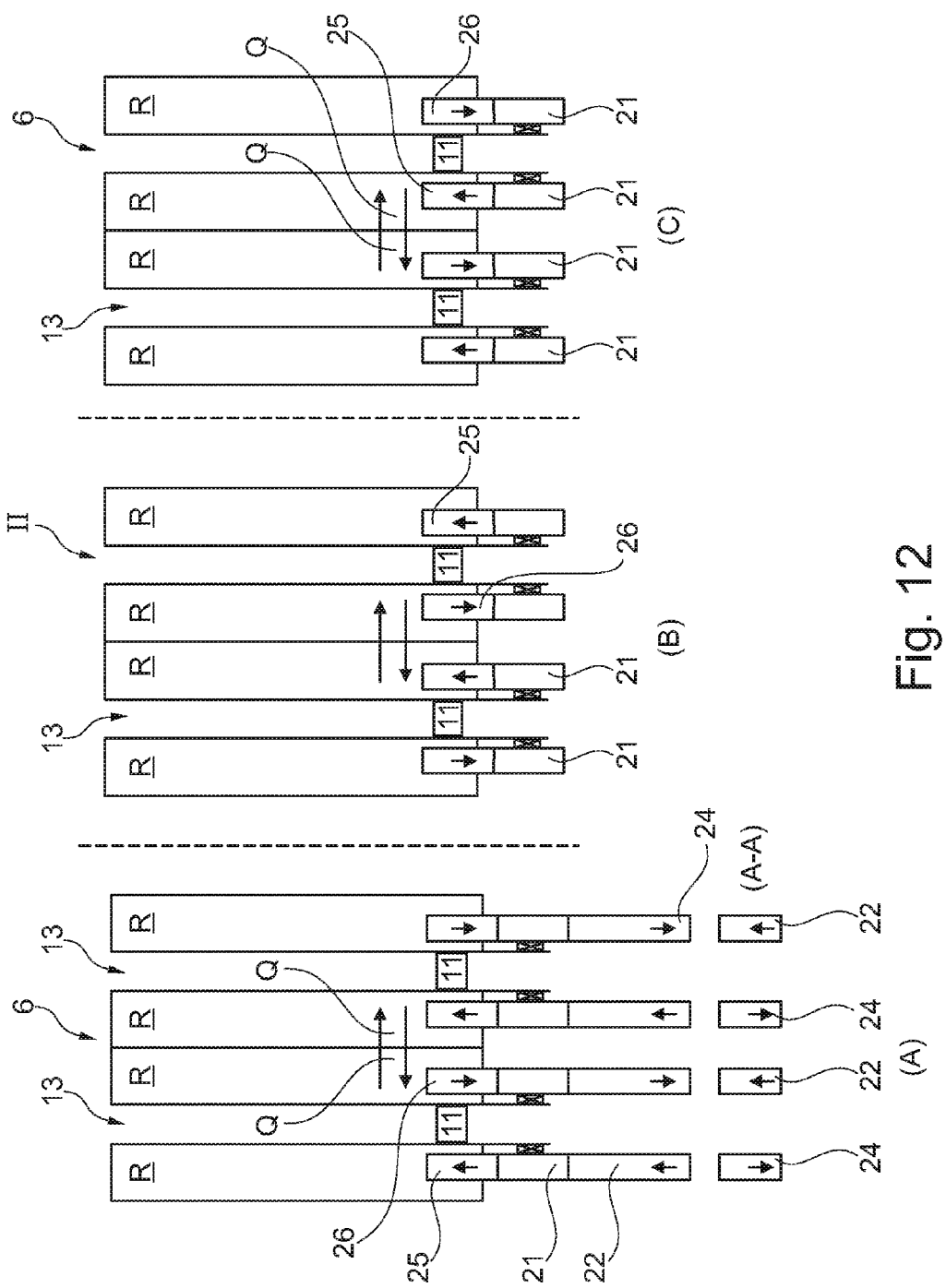

FIGS. 10-12 show alternative versions of the respective embodiments of FIGS. 7-9 with lifts outside of the storage racking are depicted. To achieve this, the rails for the shuttles 11 extend outside of the racking up to the lifts 21. Otherwise, FIG. 10 complies with FIG. 7. In FIGS. 11 and 12 the optional buffer conveyors are not shown, but otherwise they also comply with FIGS. 8-9, described above.

Figure 13:
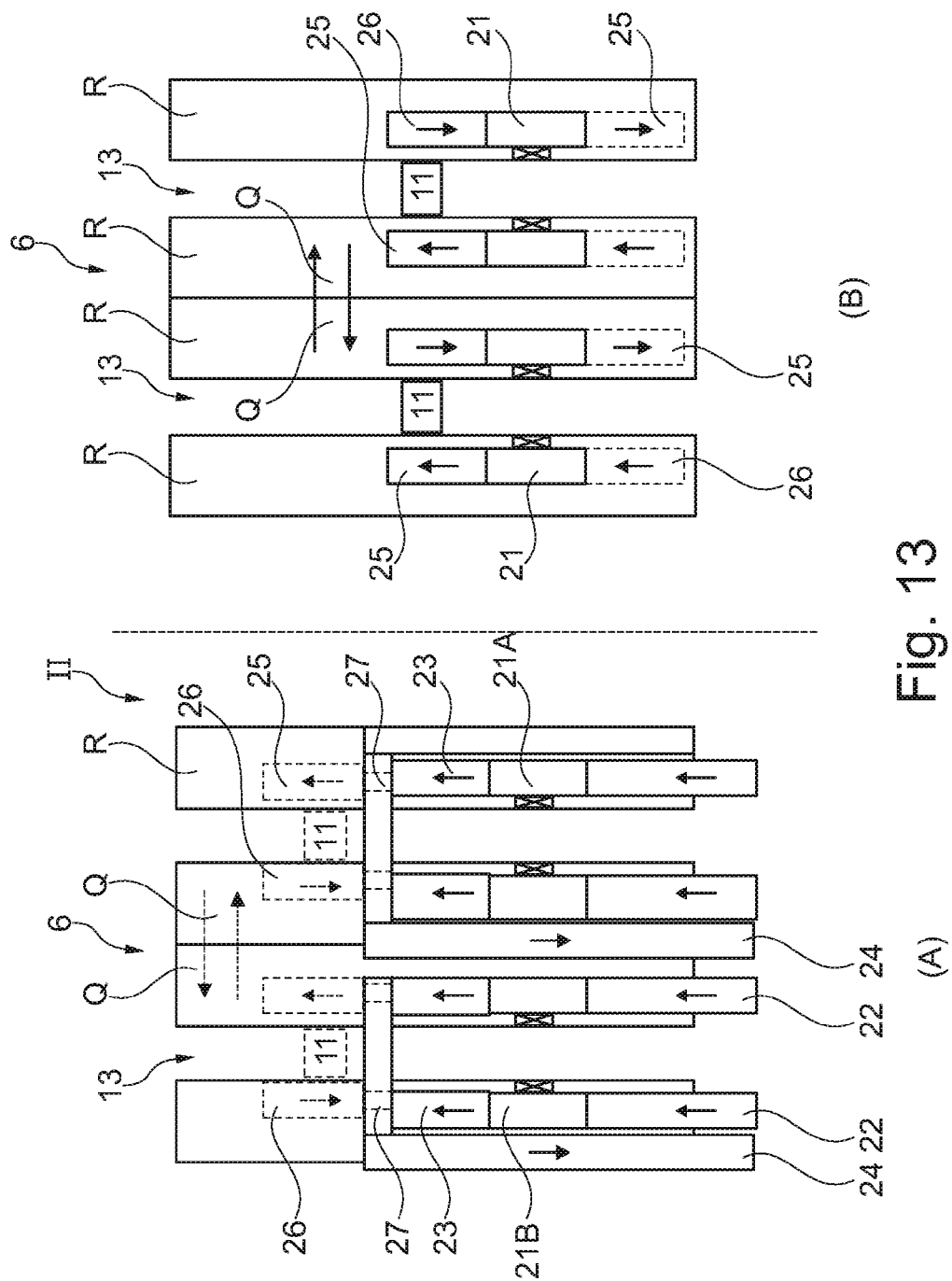
FIG. 13 shows a typical schematic plan view of a drive through type layout consisting of a first picking level and other storage levels in a further storage facility.

FIG. 13 is similar to a combination of the embodiments shown in FIGS. 5 (or 6) and 8.

Non-picking levels B are the same as in FIG. 8.

Picking-level A has a similar arrangement to FIG. 5 or 6 in that inbound-conveyor 22 leads into lift 21A, which is of the drive-through kind. Lift 21 in turn obviously may allow for a level change of units. To dispatch units from the racking to the picking station 7 etc., units are conveyed from lift 21A in level A onto outbound conveyor 23, from which the units either are redirected via a RAT or puller 27 onto exit-loop conveyor 24 and then on to storage-exit conveyor 15. Alternatively, they may pass through RAT 27 onto buffer conveyor 25 in level A. Units to be dispatched from racking in level A are dropped off onto buffer conveyor 26 by shuttle 11 in level A, which is connected to exit-loop conveyor 24.

In contrast to FIG. 5 or 6, level A also can have a second lift 21B in the same level together with conveyors 22, 23, so that the power of two lifting carriages can be utilized with a single picking station level.

In contrast to FIG. 5 or 6, level B may include a single pair of buffer conveyors to realize it's function. However, additional pairs can be added to increase the lift throughput as well as better routing. With optional buffer conveyors, units stored in any level can be routed to any lift and vice versa. The buffer conveyors are typically alternated in their conveying direction in every or every few levels, i.e., in even levels a rack R has buffer conveyors in a certain direction and in odd level in opposite direction if additional pair of buffer conveyors on each level are not allocated. Such an arrangement realizes the dual cycle lift operation which improves lift performance.

As indicated by the hashed lines in level A the buffer conveyors 25, 26, shuttles 11 and RAT's 27 as well as cross-conveyance locations Q are optional on this picking level.

The above embodiments may be combined with each other in many ways within the scope of the invention.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention. In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the appended claims.

What is claimed is:

1. A method of fulfilling orders, comprising:
    making orders available in order units by picking from product units in a storage facility, wherein the storage facility includes a manual storage and picking area, and an automated storage and retrieval racking area arranged downstream or upstream from the manual storage and picking area, and connected thereto by a routing conveyor, which leads to a shipping area, wherein the manual storage and picking area comprises manual picking stations supplied and arranged along the routing conveyor and supplying the routing conveyor with order units picked at the manual picking stations;
    wherein the automated storage and retrieval racking area comprises:
        a storage racking comprising a plurality of multilevel storage racks storing order and/or product units, and disposed in pairs with an aisle arranged therebetween;
        at least one storage-entry conveyor that feeds the order and/or product units into the storage racking;
        at least one storage-exit conveyor that retrieves the order and/or product units from the storage racking;
        at least one automatic storage and retrieval device that stores and retrieves the order and/or product units from the storage racks;
        at least one lifting device that transfers the order and/or product units to the at least one storage-exit conveyor; and
        at least one fully or semiautomatic picking station to which the order and/or product units are fed by the at least one storage-exit conveyor and from which the order and/or product units are dispatched by the at least one storage-entry conveyor for fulfilling orders; and
    wherein the routing conveyor is connected to the at least one inbound storage-entry conveyor and/or the at least one storage-exit conveyor of the storage racking;
    exchanging the order and/or product units between two adjoining storage racks from a source storage rack to an adjacent destination storage rack via cross conveyance locations;
    dispatching order units containing completed orders coming from the manual storage and picking area via the routing conveyor to the shipping area or into the storage racking via the at least one storage-entry conveyor for later dispatch;
    moving order units containing completed orders coming from the storage racking via the routing conveyor to the shipping area;
    directing order units containing completed orders coming from the fully or semiautomatic picking station via the routing conveyor to the shipping area or into the storage racking via the at least one storage-entry conveyor for later dispatch;
    introducing order units containing partial orders coming from the manual storage and picking area into the storage racking via the at least one storage-entry conveyor for further processing or directly into the fully or semiautomatic picking station for immediate processing; and
    directing order units containing partial orders coming from the fully or semiautomatic picking station or the storage racking into the storage racking or to the manual storage and picking area for further processing.

2. The method according to claim 1, further comprising displacing the order or product units in the cross conveyance locations with the automatic storage and retrieval device.

3. The method according to claim 1, further comprising placing the order or product units into the cross conveyance location in an adjacent destination rack with the automatic storage and retrieval device.

4. The method according to claim 1, wherein the automatic storage and retrieval device is fed by an inbound-buffer and feeds into an outbound-buffer, the inbound and outbound buffers are arranged within storage racks, and the cross conveyance locations are arranged directly behind or next to the inbound-buffer and/or outbound-buffer of a corresponding storage rack.

5. The method according to claim 4, wherein the outbound conveyor buffer feeds into the conveyor loop and the inbound conveyor-buffer is fed by the conveyor loop.

6. The method according to claim 1, wherein a storage rack entry and exit is formed with a conveyor loop comprising the at least one storage-entry conveyor, at least one lift and the at least one storage-exit conveyor, wherein the at least one lift is fed by the storage-entry conveyor and feeds the storage-exit conveyor.

7. The method according to claim 1, wherein a storage rack entry and exit is formed with non-loop type conveyors consisting of the at least one storage-entry conveyor, a series of lifts and the at least one storage-exit conveyor, wherein a first lift of the series of lifts is fed by the storage-entry conveyor and a second lift of the series of lifts feeds the storage-exit conveyor.

8. The method according to claim 1, wherein the automatic storage and retrieval device are single-level or multiple level rack-serving-machines.

9. The method according to claim 8, further comprising: supplying the partial orders and/or the product units from the storage racking of the automated storage and retrieval racking area with either the lower or upper level routing conveyor to the fully or semiautomatic picking station; and returning the partial orders and/or product units to the storage racking with either the upper or lower level routing conveyor.

10. The method according to claim 8, further comprising: supplying empty units to the fully or semiautomatic picking station with either upper or lower level routing conveyor.

11. The method according to claim 1, wherein the automatic storage and retrieval device includes one or more shuttles.

12. The method according to claim 1, wherein the routing conveyor has one or two levels.

* * * * *